United States Patent [19]

Fuisz

[11] Patent Number: 5,288,508
[45] Date of Patent: Feb. 22, 1994

[54] DELIVERY SYSTEMS CONTAINING ELASTOMER SOLVENTS SUBJECTED TO FLASH FLOW

[75] Inventor: Richard C. Fuisz, Great Falls, Va.

[73] Assignee: Fuisz Technologies, Ltd., Chatilly, Va.

[21] Appl. No.: 855,599

[22] Filed: Mar. 20, 1992

[51] Int. Cl.$^5$ .............................................. A23G 3/30
[52] U.S. Cl. ...................................... 426/5; 426/516; 426/650
[58] Field of Search ..................................... 426/3–6, 426/516, 517, 650

[56] References Cited

U.S. PATENT DOCUMENTS

| | | |
|---|---|---|
| 2,973,273 | 2/1959 | Curtiss . |
| 3,019,745 | 2/1962 | Du Bois et al. . |
| 3,036,532 | 5/1962 | Bowe . |
| 3,070,045 | 12/1962 | Bowe . |
| 3,071,476 | 1/1963 | Werft et al. . |
| 3,073,262 | 1/1963 | Bowe . |
| 3,455,755 | 7/1969 | Phillips . |
| 3,557,717 | 1/1971 | Chivers . |
| 3,595,675 | 7/1971 | Ash et al. . |
| 3,723,134 | 3/1973 | Chivers . |
| 3,762,846 | 10/1973 | Chivers . |
| 3,795,744 | 3/1974 | Ogawa et al. . |
| 3,826,847 | 7/1974 | Ogawa et al. . |
| 3,856,443 | 12/1974 | Salvi . |
| 3,920,849 | 11/1975 | Marmo et al. . |
| 3,930,043 | 12/1975 | Warning et al. . |
| 4,496,592 | 1/1985 | Kuwahara et al. . |
| 4,515,769 | 5/1985 | Merritt et al. . |
| 4,526,525 | 7/1985 | Oiso et al. . |
| 4,740,376 | 4/1988 | Yang . |
| 4,793,782 | 12/1988 | Sullivan . |
| 4,855,326 | 8/1989 | Fuisz . |
| 4,873,085 | 10/1989 | Fuisz . |
| 4,885,281 | 12/1989 | Hanstein et al. . |
| 4,891,209 | 1/1990 | Heim . |
| 4,933,189 | 6/1990 | Cherukuri et al. . |
| 4,978,537 | 12/1990 | Song . |
| 4,992,280 | 2/1991 | Yung Chu et al. . |
| 4,997,856 | 3/1991 | Fuisz . |
| 5,011,532 | 4/1991 | Fuisz . |
| 5,028,632 | 7/1991 | Fuisz . |
| 5,034,421 | 7/1991 | Fuisz . |
| 5,096,492 | 3/1992 | Fuisz . |
| 5,165,944 | 11/1992 | Song et al. ............................ 426/5 |

FOREIGN PATENT DOCUMENTS

| | | |
|---|---|---|
| 88/2770 | 4/1988 | South Africa . |
| 88/2771 | 4/1988 | South Africa . |
| 89/9318 | 12/1989 | South Africa . |
| 90/2139 | 3/1990 | South Africa . |

*Primary Examiner*—Jeanette Hunter
*Attorney, Agent, or Firm*—Hoffmann & Baron

[57] ABSTRACT

Chewing gum bases having flavorants dispersed in a matrix formed with gum base elastomer solvents under conditions of flash flow are disclosed. Chewing gum compositions containing the gum base display prolonged flavor release due to the tendency of the cud to release flavorants during chewing.

35 Claims, No Drawings

DELIVERY SYSTEMS CONTAINING ELASTOMER SOLVENTS SUBJECTED TO FLASH FLOW

BACKGROUND OF THE INVENTION

The present invention is directed to a method of engineering chewing gum compositions to predictably release flavorants in the oral cavity. In particular, the present invention is directed to chewing gum bases which optimize the organoleptic characteristics of the chewing gum compositions during chewing.

In the art of gum making, it is well known that chewing gum compositions contain two primary components: water-soluble materials, principally the flavor and sweetener ingredients, and water-insoluble gum base materials made up of elastomers, resins, elastomer solvents, plasticizers and the like. The water-soluble materials are released to a certain extent during chewing to provide the organoleptic sensations of flavor and/or sweetness in the oral cavity, while the water-insoluble component remains in the oral cavity during chewing as a cud.

A commonly noted deficiency in all chewing gums has been the relatively rapid exhaustion of the flavor and/or sweetness during chewing. Over the years, there has been considerable investigation and experimentation directed to prolonging flavor/sweetness sensations during the chewing of the gum product. The perceived flavor characteristics of a chewing gum composition are not necessarily proportional to the amount of flavoring materials included in the gum composition since a significant portion of the gum flavorants become bound up and enmeshed within the chewing gum cud.

Many schemes have been attempted to overcome the peculiar characteristic of rapid flavor exhaustion known in the gum art. For example, a myriad of flavor and/or sweetener delivery systems has been proposed to prolong organoleptic sensations. Increasing and/or decreasing the amount of one or more of the ingredients as well as encapsulating flavorants in various substances have all been proposed. For example, U.S. Pat. No. 3,826,847 discloses encapsulating flavor oils in polyvinyl acetates. Once encapsulated, the flavor oils are incorporated into a chewing gum base and finally, the gum product. Similarly, U.S. Pat. No. 3,920,849 discloses extending flavor release by encapsulating a portion of the flavorants prior to addition to the gum base.

In spite of the contributions discussed above, a need still exists in the art of gum making for extending the flavor release of gum compositions.

It is, therefore, an object of the present invention to provide chewing gum compositions having extended flavor release characteristics.

It is a further object of the present invention to enable the chewing gum artisan to more accurately engineer and predict the flavor and/or sweetness patterns of gum compositions.

Other and further objects of the present invention will become apparent from the following description and its scope will be pointed out in the appended claims.

SUMMARY OF THE INVENTION

The present invention includes a novel chewing gum base which provides long lasting flavor. The gum base includes a matrix containing a flavorant dispersed within a gum base elastomer solvent. Examples of such elastomer solvents include gum rosin materials such as the pentaerythretol ester of wood rosin, glycerol ester of dimerized rosin, mixtures thereof and the like. The elastomer solvents are present in amounts of from about 60 to about 99% by weight of the matrix, with amounts of from about 70 to about 99% being preferred. The gum base also includes an elastomer selected from natural materials such as chicle and/or synthetic materials such as styrene-butadiene.

For the purposes of the present invention, flavorants include flavors, sweeteners, high intensity sweeteners and combinations thereof. The flavorant is present in the melt-spun matrix in amounts ranging from about 0.01 to about 40% by weight, with amounts of from about 0.1 to about 30% being preferred, and amounts of from about 1 to about 15% being most preferred.

The elastomer portion of the gum base is present in amounts of from about 5 to about 20% by weight, with amounts of from about 7 to about 15% being preferred. The melt-spun matrix, on the other hand, is present in amounts of from about 10 to about 75% by weight and preferably in amounts of from about 25 to about 40% by weight of the gum base.

The present invention also includes chewing gum compositions. The gum compositions include a gum base as set forth above in amounts of from about 5 to about 85% by weight, and preferably in amounts of from about 10 to about 70% by weight.

In further aspects of the present invention, there are also provided methods of preparing the novel chewing gum base and the chewing gum compositions.

As a result of the present invention, chewing gum bases are provided which dramatically improve the flavor release characteristics of chewing gum compositions. The improved characteristics are believed to be achieved as a result of melt-spinning flavorants with the gum base elastomer solvent. The novel gum base is also in a physical state which allows both spun and unspun flavorants to be more readily released in the oral cavity instead of being bound in the cud. This phenomena is especially observable when hydrolyzable flavorants are spun into the matrix. In such situations, as the flavorants dissolve during mastication, a series of reticular-like channels are formed to allow the release of otherwise bound flavorants from the cud.

The novel gum base and gum compositions also allow the gum artisan to more predictably gauge the amount of flavorant that can be released into the oral cavity from a piece of gum. As a result, the artisan has a reasonable expectation that the intensity of the flavorant released will be more closely related to the amount of flavorant included in the gum composition.

For a better understanding of the present invention, reference is made to the following description, and its scope will be pointed out in the appended claims.

DETAILED DESCRIPTION OF THE INVENTION

It has been surprisingly found that flavor release in chewing gum compositions can be significantly prolonged by melt-spinning flavorants with gum base elastomer solvents. In accordance therewith, the present invention includes a melt-spun matrix of an elastomer solvent and a flavorant dispersed therein. The matrix is then included in gum bases which also contain conventional chewing gum base ingredients such as plasticizers, mineral adjuvants, antioxidants, preservatives, colorants and the like.

The elastomer solvents which can be melt-spun are selected from various chewing gum-acceptable ingredients. For example, a non-limiting list of such ingredients include terpene resins, such as polymers of alpha-pinene or beta-pinene; rosin derivatives including hydrogenated or partially hydrogenated derivatives, such as the glycerol ester of polymerized rosin; alcohol esters of rosin, such as the glycerol ester of hydrogenated rosin, the pentaerythritol ester of hydrogenated resin, the glycerol ester of rosin and mixtures thereof. Several of the illustrative gum base elastomer solvents are available from the Sigma Company. The elastomer solvents are present in amounts of from about 60% to about 99% by weight of the matrix, with amounts of from about 70 to about 99% being preferred.

The spinning process by which flavorants are combined with the elastomer solvent material preferably includes floss-spinning or "cotton candy"-fabricating type equipment. The floss spinning machine used herein can be any cotton candy type machine, such as the Econo Floss Model 3017 manufactured by Gold Metal Products Company of Cincinnati, Ohio. It will be appreciated by those skilled in the art from the present description that any apparatus or physical process which provides similar shear forces and time/temperature gradient conditions can also be used. For simplicity in disclosing and describing this invention, the term "melt-spinning" will be understood to mean a flash flow process which includes a combination of temperature, shear, flow, flow rate, mechanical forces and thermal gradients of the type used in a cotton candy-type machine. The apparatus is operated at a temperature and speed which permits flash flow but does not deteriorate the material undergoing the processing. Usually the resulting matrix product is in the form of a crystalline or cottony floss, flake, spicule or other generally nondescript aggregate capable of subsequent processing in accordance with generally accepted techniques.

The flash flow process contemplates subjecting carrier solids to a melt-spin process (or conditions comparable thereto) which provide sufficient internal flow to permit the transition in structure without degradation of the material. Internal flow occurs when the infrastructure of the material breaks down sufficiently to permit movement of material at a subparticle level, and probably at a molecular level. At a molecular level, internal flow contemplates the movement of molecules relative to each other.

Internal flow of material is generally associated with melting point or glass transition point. However, it is contemplated that the combined application of heat and external force is sufficient to produce the flow at temperatures below the melting or glass transition point for most compositions.

For purposes of the present invention, flavorants are defined as including any one or combination of flavors, sweeteners and any other organoleptically perceivable materials.

Flavors may be chosen from natural and synthetic flavoring liquids. An illustrative list of such agents includes volatile oils, synthetic flavor oils, flavoring aromatics, oils, liquids, oleoresins or extracts derived from plants, leaves, flowers, fruits, stems and combination thereof. A non-limiting representative list of examples includes citrus oils such as lemon, orange, grape, lime and grapefruit and fruit essences including apple, pear, peach, grape, strawberry, raspberry, cherry, plum, pineapple, apricot or other fruit flavors.

Other useful flavorings include aldehydes and esters such as benzaldehyde (cherry, almond), citral, i.e., alphacitral (lemon, lime), neral, i.e., beta-citral (lemon, lime) decanal (orange, lemon), aldehyde C-8 (citrus fruits), aldehyde C-9 (citrus fruits), aldehyde C-12 (citrus fruits), tolyl aldehyde (cherry, almond), 2,6-dimethyloctanal (green fruit), and 2-dodecenal (citrus, mandarin), mixtures thereof and the like.

The present invention contemplates the inclusion of both natural and artificial sweeteners. The sweeteners may be chosen from the following non-limiting list: sugars such as sucrose, glucose (corn syrup), dextrose, invert sugar, fructose, and mixtures thereof; saccharin and its various salts such as the sodium salt; dipeptide sweeteners such as aspartame; dihydrochalcone compounds, glycyrrhizin; Stevia Rebaudiana (Stevioside); chloro derivatives of sucrose such as sucralose; sugar alcohols such as sorbitol, mannitol, xylitol, and the like. Also contemplated are hydrogenated starch hydrolysates and the synthetic sweetener 3,6-dihydro-6-methyl-1-1-1,2,3-oxathiazin-4-one-2,2-dioxide, particularly the potassium salt (acesulfame-K), and sodium and calcium salts thereof.

The amount of the flavorant included in the melt-spun matrix is a matter of preference for the artisan. It is contemplated, however, that the flavorant will be present in amounts of from about 0.01% to about 40%, preferably from about 0.1% to about 30%, and most preferably from about 1% to about 15% by weight of the melt-spun matrix.

In addition to elastomer solvents, flavorants may be melt-spun with other water-insoluble chewing gum base materials. For example, detackifying agents such as polyvinyl acetate, polyvinyl butyl ether, copolymers of vinyl esters and vinyl ethers, polyethylene, ethylene-vinyl acetate copolymers and the like may be melt-spun with a flavorant.

Because of the nature of the process described above, the materials are at melt-spinning temperatures, the artisan may also include heat sensitive sweetening agents and/or flavoring agents, particularly high intensity sweetening agents, such as aspartame, in the spun product if desired.

By melt-spinning a flavorant with elastomer solvents, the tendency of the water-insoluble cud to bind up flavorant materials has been largely overcome. While applicant is not bound by theory, it is believed that melt-spinning flavorants with the very vehicle which is used to "open up" the gum base as a solvent significantly enhances distribution and release of the flavorant during mastication. This unique property results in a dramatic improvement in flavor impact and duration in the oral cavity. In addition, the hydrolyzable nature of most flavorants allows a reticular-like network within the cud to be formed. During the course of mastication, channels of escape for the flavorants from the cud are made as the flavorant spun with the solvent dissolve. Thus, the insoluble cud no longer serves as a trap for flavorants but, instead, becomes a reservoir releasing flavorants during chewing over a prolonged period of time.

The flavorant and elastomer solvent can be combined in the flossing machine during melt-spinning. In some cases, an oleaginous substance such as corn oil or polyvinylpyrrolidone (PVP), can be added to ensure distribution of the flavorant throughout the matrix of the spun product. For example, 2 parts oil or a 2-3% solution of PVP may be added to the ingredients during the melt-spinning.

Depending on the materials selected, the resultant matrix may take the form of a crystalline or cottony floss, a flake or spicule. The exact form of the resultant matrix, however, is not an essential part of the present invention. The melt-spun matrix will be present in amounts of from about 10 to about 75% by weight and preferably from about 25 to about 40% by weight of the gum base.

The elastomer component of the gum base can be selected from synthetic elastomers such as styrene-butadiene copolymers (butyl rubber), natural rubber (polyisoprene), as well as masticatory substances of natural origin, such as rubber latex solids, chicle, crown gum, nisparo, rosidinha, jelutong, pendare, perillo, niger gutta, tunu, etc. Mixtures of these materials are also useful. The elastomer is present in amounts of from about 5 to about 20% of the gum base and preferably from about 7 to about 15%.

In addition to the elastomer and spun matrix, traditional ingredients such as plasticizers or softeners may also be incorporated into the gum base to obtain a variety of desirable textures and consistency properties. Such materials may be selected from lanolin, stearic acid, sodium stearate, potassium stearate, glycerol triacetate, glycerin and the like, for example, natural waxes, such as polyurethane waxes, paraffin waxes, microcrystalline waxes and mixtures thereof. These ingredients, however, may be reduced in amount or in some cases, may be eliminated entirely. When present, these individual additional materials are generally employed in amounts of up to about 15% by weight and preferably in amounts of from about 3% to about 10% by weight of the final gum base composition.

The gum base may include mineral adjuvants such as calcium carbonate, magnesium carbonate, alumina, aluminum hydroxide, aluminum silicate, talc, tricalcium phosphate and the like; as well as mixtures thereof. These mineral adjuvants may also serve as fillers and texturizing agents.

Fatty acids may also be included to serve as softeners. Suitable fatty acids would include, for example, stearic acid, palmitic acid, oleic acid, and mixtures thereof. The gum base may also include emulsifiers such as lecithin, glycerol monostearate, fatty acid monoglycerides, diglycerides and triglycerides, glycerol triacetate, propylene glycol monostearate and mixtures thereof.

The gum base composition may also include conventional additives such as antioxidants, preservatives, colorants and the like. For example, titanium dioxide may be used as a colorant, and butylated hydroxytoluene, butylated hydroxyanisole, and mixtures thereof, may also be included as antioxidants.

The chewing gum base may be prepared using conventional processing techniques. For example, the elastomers are thoroughly combined and mixed with the elastomer solvent-containing spun matrix and any filler and texturizing agents until a paste is formed. Thereafter, any remaining ingredients such as waxes, fatty acids, plasticizers and softeners are separately added during mixing.

A further aspect of the present invention includes chewing gum compositions which contain the novel gum base. The chewing gum compositions of the present invention may be prepared by adding chewing gum ingredients to the gum base according to conventional chewing gum making techniques. The amount of the gum base will vary greatly depending on various factors such as the type of base used, consistency desired and other components used to make the final product. In general, amounts of from about 5% to about 85% by weight of the final chewing gum composition are acceptable, with preferred amounts of from about 10% to about 70% by weight.

In this regard, the chewing gum ingredients include a water-soluble flavor portion having one or more water soluble ingredients which are released in the oral cavity during chewing. A non-limiting list of such water-soluble ingredients includes polysaccharide-based bulking agents such as sugars or sugar alcohols, liquid flavors, spray-dried flavors, flavor delivery systems, natural and/or artificial sweeteners and the like. In a preferred embodiment, the chewing gum composition includes a rapidly soluble, melt-spun matrix such as that set forth in commonly assigned U.S. patent application Ser. Nos. 07/787,245 and 07/782,430. For example, rapidly soluble matrices can be prepared using a variety of saccharide-based carriers and one or more flavorants as described herein. A non-limiting list of such melt-spinnable carriers include sucrose, maltose, lactose, fructose, dextrose, sorbitol, mannitol, fluctose, polydextrose, maltodextrins, corn syrup solids and the like and mixtures thereof. In this embodiment, the chewing gum compositions display not only high initial flavor impact but also prolonged flavor release as well.

In one alternative aspect of this embodiment, a combination of flavor systems is used to provide a unique organoleptic experience whereby sequential flavor release is obtained. A first flavorant is included with the elastomer solvent matrix for prolonged flavor release while a second flavorant is provided for rapid release, preferably a part of a saccharide-based matrix described above. Alternatively, liquid, spray dried and/or flavor delivery systems can be used in place of or in addition to the rapidly-releasable saccharide matrices. When each of the flavor systems is combined in a chewing gum composition, a novel, sequential flavor release is obtained. For example, a citrus-like flavorant can be combined with sucrose or corn syrup solids to form a rapidly-releasing flavor matrix, while a contrasting flavor such as a mint flavor is melt-spun with an elastomer solvent to provide a separate and distinct later flavor sensation.

The chewing gum compositions of the present invention can be prepared by combining the water-insoluble base portion and the water-soluble flavor portion according to conventional chewing gum processing techniques.

For illustrative purposes, a method of preparing the novel chewing gum products is as follows:

A suitable quantity of the novel chewing gum base is melted and softeners and bulking agents such as sugar alcohols are then slowly added with stirring. Flavor oils and/or spray dried flavors or flavor delivery systems are added to the above mixture and mixing is continued until a homogeneous mass is achieved. Optionally, a high intensity sweetener such as saccharin, its salts, aspartame or acesulfame-K may be added and mixing is continued until an even distribution is obtained. Thereafter, chewing gum mass is cooled and may be rolled, scored, dusted and wrapped in any manner known in the art.

An important feature of the chewing gum compositions prepared in accordance with the present invention is the ability of the chewing gum to provide long-lasting release of flavorants during chewing in the oral cavity. The unique melt-spun nature of the gum base elastomer solvent also avoids entrapment of the flavorants within the insoluble chewing gum cud during chewing.

EXAMPLES

The following examples serve to provide further appreciation of the invention, but are not meant in any way to restrict the effective scope of the invention. Unless indicated otherwise, the Econo Floss machine referred to above was used to form the spun fiber matrix.

EXAMPLE 1

Gum Rosin-Flavorant Matrix

In this example, a gum base including the novel spun matrix was prepared. A 100 gram quantity of Sigma gum rosin was combined with 2 grams of spearmint flavor oil. After the ingredients were thoroughly combined, the mixture was melt-spun at a high setting to produce a crystalline, insoluble floss having a strong minty aroma and taste.

Once formed, the matrix was included in a gum base having the ingredients set forth in Table 1, below.

TABLE 1

| GUM BASE 1 | |
|---|---|
| INGREDIENT | WT. % |
| Elastomer - Styrene Butadiene | 13.0 |
| Spun Matrix | 35.0 |
| Microcrystalline Wax | 12.0 |
| Calcium Carbonate | 30.0 |
| Butyl Hydroxyanisol | 3.0 |
| Glyceryl Triacetate (Triacetin) | 5.0 |
| Palm Oil | 2.0 |
| | 100.0 |

The elastomer was melted in a kettle and thereafter, the spun matrix, prepared as described above, and calcium carbonate were added and mixing was continued. The wax was added to this mixture and finally the butylhydroxyanisol, glyceryl triacetate and palm oil were separately added and uniformly distributed in the mixture to form the gum base.

EXAMPLE 2

In this example, a second inventive gum base was prepared using the procedure set forth in Example 1 except that the natural elastomer chicle is substituted for styrene butadiene. The gum base had the formula set forth below in Table 2.

TABLE 2

| INGREDIENT | WT. % |
|---|---|
| Elastomer - Chicle | 13.0 |
| Spun Matrix | 35.0 |
| Microcrystalline Wax | 12.0 |
| Calcium Carbonate | 30.0 |
| Butyl Hydroxyanisol | 3.0 |
| Glyceryl Triacetate (Triacetin) | 5.0 |
| Palm Oil | 2.0 |
| | 100.0 |

In Examples 3-4, the gum bases prepared in Examples 1-2 are incorporated into chewing gum compositions having the formulae set forth below.

EXAMPLE 3

| SUGAR CHEWING GUM | |
|---|---|
| INGREDIENT | WT. % |
| Gum Base 1 | 35.00 |
| Powdered Sugar | 40.00 |
| Corn Syrup | 20.00 |
| Flavor Oil | 1.85 |
| Colorant | 0.15 |
| | 100.00 |

As a result of incorporating bases with flavor already included, the artisan can also avoid undue deliveration in mixing the composition. A good deal of the flavor engineering can be accomplished in the preparation of the base.

While there have been described what are presently believed to be the preferred embodiments of the present invention, those skilled in the art will realize that changes and modifications may be made thereto without departing from the spirit of the invention, and it is intended to claim all such changes and modifications as fall within the true scope of the invention.

What is claimed is:

1. A chewing gum base, comprising:
   a) an elastomer component; and
   b) a matrix prepared by subjecting a feedstock comprising an elastomer solvent and a flavorant to conditions which create flash flow, said elastomer solvent present in said feedstock in an amount sufficient to provide a throughput, whereby the structure of the elastomer solvent is altered and said matrix is formed which is a generally non-descript aggregate.

2. The chewing gum base of claim 1, wherein said elastomer is selected from the group consisting of styrenebutadiene copolymer, polyisobutylene, polyisoprene, isobutylene-isoprene copolymer, natural elastomers and combinations thereof.

3. The chewing gum base of claim 2, wherein said elastomer solvent is selected from the group consisting of gum rosins, the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, glycerol ester of partially hydrogenated wood rosin, glycerol ester of partially hydrogenated methyl ester of wood rosin and mixtures thereof.

4. The chewing gum base of claim 3, wherein said flavorant is selected from the group consisting of flavors, sweeteners and mixtures thereof.

5. The chewing gum base of claim 4, wherein said flavor is selected from the group consisting of natural flavors, artificial flavors and mixtures thereof.

6. The chewing gum base of claim 4, wherein said sweetener is selected from the group consisting of saccharin, saccharin salts, cyclamic acid, cyclamic acid salts, aspartame, sucralose, acesulfame, and combinations thereof.

7. The chewing gum base of claim 6, wherein said flavorant is present in an amount of from about 0.01% to about 40% by weight of said matrix.

8. The chewing gum base of claim 6, wherein said flavorant is present in an amount of from about 0.1% to about 30% by weight of said matrix.

9. The chewing gum base of claim 8, wherein said flavorant is present in an amount of from about 1% to about 15% by weight of said matrix.

10. The chewing gum base of claim 9, wherein said elastomer component is included in an amount of from about 5% to about 20% by weight of said base.

11. The chewing gum base of claim 10, wherein said elastomer component is included in an amount of from about 7% to about 15%.

12. The chewing gum base of claim 11, wherein said melt-spun matrix is present in an amount of from about 10% to about 75% by weight based on said gum base.

13. The chewing gum base of claim 12, wherein said melt-spun matrix is present in an amount of from about 25% to about 40% by weight based on said gum base.

14. A method of preparing a chewing gum base, comprising:
combining a chewing gum base elastomer with a matrix prepared by subjecting a feedstock comprising an elastomer solvent and a flavorant to conditions which create flash flow, said elastomer solvent present in said feedstock in an amount sufficient to provide a throughput, whereby the structure of the elastomer solvent is altered and said matrix is formed which is a generally non-descript aggregate.

15. The method of claim 14, wherein said elastomer solvent is selected from the group consisting of gum rosins, the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, glycerol ester of partially hydrogenated wood rosin, glycerol ester of partially hydrogenated methyl ester of wood rosin and mixtures thereof.

16. The method of claim 15, wherein said chewing gum base elastomer is selected from the group consisting of styrene-butadiene copolymer, polyisobutylene, polyisoprene, isobutylene-isoprene copolymer and natural elastomers and combinations thereof.

17. A chewing gum composition comprising:
a gum base comprising a matrix prepared by subjecting a feedstock comprising an elastomer solvent and a flavorant to conditions which create flash flow, said elastomer solvent present in said feedstock in an amount sufficient to provide a throughput, whereby the structure of the elastomer solvent is altered and said matrix is formed which is a generally non-descript aggregate.

18. The chewing gum composition of claim 17, wherein said elastomer solvent selected from the group consisting of gum rosins, the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, glycerol ester of partially hydrogenated wood rosin, glycerol ester of partially hydrogenated methyl ester of wood rosin and mixtures thereof.

19. The chewing gum composition of claim 18, wherein said flavor is selected from the group consisting of natural flavors, artificial flavors and mixtures thereof.

20. The chewing gum composition of claim 18, wherein said sweetener is selected from the group consisting of saccharin, saccharin salts, cyclamic acid, cyclamic acid salts, aspartame, sucralose, acesulfame, and combinations thereof.

21. The chewing gum composition of claim 20, wherein said gum base is present in an amount of from about 5% to about 85% by weight of the final chewing gum composition.

22. The chewing gum composition of claim 21, wherein the gum base is present in an amount of from about 10% to about 70% by weight of the final chewing gum composition.

23. The chewing gum composition of claim 17, further comprising an additional flavorant.

24. The chewing gum composition of claim 23, wherein said flavorant is selected from the group consisting of flavors, sweeteners and mixtures thereof.

25. The chewing gum composition of claim 23, wherein such additional flavorant is dispersed in a rapidly soluble matrix formed by melt-spinning said additional flavorant with a carrier material.

26. The chewing gum composition of claim 25, wherein said carrier material is selected from the group consisting of sucrose, maltose, lactose, fructose, dextrose, sorbitol, mannitol, fluctose, polydextrose, maltodextrin, corn syrup solids and mixtures thereof.

27. The chewing gum composition of claim 23, wherein said flavorant and said additional flavorant are the same.

28. The chewing gum composition of claim 23, wherein said flavorant and said additional flavorant are different.

29. A method of preparing a chewing gum composition, comprising:
mixing chewing gum ingredients and a gum base for a time and in an amount sufficient to form a substantially homogenous chewing gum product, said gum base comprising an elastomer and a matrix prepared by subjecting a feedstock comprising an elastomer solvent and a flavorant to conditions which create flash flow, said elastomer solvent present in said feedstock in an amount sufficient to provide a throughput, whereby the structure of the elastomer solvent is altered and said matrix is formed which is a generally non-descript aggregate.

30. The method of claim 29, further comprising mixing an additional flavorant with said gum base and said chewing gum ingredients.

31. The method of claim 30, wherein said additional flavorant is selected from the group consisting of flavors, sweeteners and mixtures thereof.

32. The method of claim 31, wherein said additional flavorant is dispersed in a rapidly soluble matrix formed by melt-spinning said additional flavorant with a carrier material.

33. The method of claim 32, wherein said carrier material is selected from the group consisting of sucrose, maltose, lactose, fructose, dextrose, sorbitol, mannitol, fluctose, polydextrose, maltodextrin, corn syrup solids and mixtures thereof.

34. The method of claim 30, wherein said flavorant and said additional flavorant are the same.

35. The method of claim 30, wherein said flavorant and said additional flavorant are different.

* * * * *

UNITED STATES PATENT AND TRADEMARK OFFICE
CERTIFICATE OF CORRECTION

PATENT NO. : 5,288,508
DATED : February 22, 1994
INVENTOR(S) : Richard C. Fuisz

It is certified that error appears in the above-indentified patent and that said Letters Patent is hereby corrected as shown below:

Column 7, Lines 55-56, now reads

" | Table 2 |
|---|---|
| INGREDIENT | WT.% |
,"

should read

-- | Table 2 |
|---|---|
| GUM BASE 2 | |
| INGREDIENT | WT.% |
--.

UNITED STATES PATENT AND TRADEMARK OFFICE
CERTIFICATE OF CORRECTION

PATENT NO. : 5,288,508
DATED : February 22, 1994
INVENTOR(S) : Richard C. Fuisz

It is certified that error appears in the above-indentified patent and that said Letters Patent is hereby corrected as shown below:

Column 8, Line 11, should read

-- Example 4

SUGARLESS CHEWING GUM

| INGREDIENT | WT.% |
|---|---|
| Gum Base 2 | 23.8 |
| Carbohydrates | 65.0 |
| Softeners | 10.0 |
| Colorant | 0.2 |
|  | 100.0 |

--.

Signed and Sealed this

Fourth Day of October, 1994

Attest:

BRUCE LEHMAN

Attesting Officer

Commissioner of Patents and Trademarks